Sept. 21, 1965 R. G. WHITE 3,207,861

DUAL SWITCH ASSEMBLY INCLUDING TWO SWITCHES OPERATED INDEPENDENTLY BY A COMMON DRIVE SHAFT

Filed June 20, 1963 2 Sheets-Sheet 1

INVENTOR
BY ROBERT G. WHITE
BUCKHORN, BLORE, KLARQUIST & SPARKMAN
ATTORNEYS

Sept. 21, 1965 R. G. WHITE 3,207,861

DUAL SWITCH ASSEMBLY INCLUDING TWO SWITCHES OPERATED INDEPENDENTLY BY A COMMON DRIVE SHAFT

Filed June 20, 1963 2 Sheets-Sheet 2

INVENTOR
ROBERT G. WHITE

BY
BUCKHORN, BLORE, KLARQUIST & SPARKMAN
ATTORNEYS

United States Patent Office 3,207,861
Patented Sept. 21, 1965

3,207,861
DUAL SWITCH ASSEMBLY INCLUDING TWO SWITCHES OPERATED INDEPENDENTLY BY A COMMON DRIVE SHAFT

Robert G. White, Portland, Oreg., assignor to Tektronix, Inc., Beaverton, Oreg., a corporation of Oregon
Filed June 20, 1963, Ser. No. 289,212
8 Claims. (Cl. 200—14)

The present invention relates generally to electrical switches, and in particular to a dual switch assembly in which two different switches are operated independently by means of a common drive shaft and a transfer mechanism which couples such drive shaft to one or the other of such switches depending on the rotational position of such drive shaft.

The dual switch assembly of the present invention is especially useful when employed as the control switch on the front panel of a plug-in unit for a cathode ray oscilloscope, which may contain the horizontal or vertical preamplifier of such oscilloscope. The present switch assembly has several advantages over previous switches employed for oscilloscopes, including reduced shunt capacitance and a construction which allows changing the gain of the preamplifier without appreciable drift of the signal trace viewed on the fluorescent screen of such oscilloscope. In addition, the dual switch assembly has the added convenience of independently operating two switches by a single knob and drive shaft and includes a provision so that only one of such switches can be operated at the same time.

When the present dual switch is used for the vertical preamplifier of the oscilloscope, one of the switch sections may be connected to an amplifier with a voltage gain of ten and may be provided with nine switch positions covering the range of 50 millivolts per centimeter to 20 volts per centimeter. The second switch section of the dual switch may be connected to an amplifier having a voltage gain of one hundred and may be provided with three switch positions to cover the range of 5 millivolts per centimeter to 20 millivolts per centimeter. Ordinarily it is desirable to have only one of these amplifiers connected as the vertical preamplifier of the oscilloscope at the same time to prevent an error in determining the voltage of the signal wave form. The dual switch of the present invention eliminates the source of this error by employing a single knob which cannot be operated to connect both of such amplifiers to the input terminal of the oscilloscope at the same time. The present switch also employs a novel transfer mechanism which couples the rotational movement of a common drive shaft to one of the two switch sections merely by rotating such drive shaft to different positions. Thus the transfer of rotational force from one switch section to the other is accomplished without any pushing or pulling of the knob and requires no additional front panel controls. This simplified switch construction allows smooth trouble free operation and insures against operator error. Also by employing two switch sections independently controlled by a common drive shaft, the dual switch assembly of the present invention achieves twice the number of possible switch positions within the same mounting space on the control panel of the oscilloscope plug-in units.

It is therefore one object of the present invention to provide an improved electrical switch assembly of a simple and economical construction.

Another object of the invention is to provide an improved dual electrical swich assembly in which a pair of switch sections are operated independently by a common drive shaft and a transfer mechanism which connects such drive shaft to one or the other of the switch sections.

A further object of the present invention is to provide an improved dual electrical switch which is operated in a simple manner merely by rotating a single knob to change the position of two different switch sections and which prevents both of the switch sections from being operated at the same time.

An additional object of the present invention is to provide an improved electrical switch having an increased number of switch positions and being of compact construction so as to reduce the mounting space required on the control panel of apparatus incorporating such switch.

Still another object of the invention is to provide an improved dual switch assembly for the vertical preamplifier of a cathode ray oscilloscope in which a pair of independently operated switch sections are employed to decrease the shunt capacitance of such switch assembly and to reduce the drive of the signal trace on the oscilloscope due to changes in the gain of different amplifiers separately connected to such switch sections.

Other objects and advantages of the present invention will be apparent from the following detailed description of certain preferred embodiments thereof and from the attached drawings of which:

Figures 1, 2:
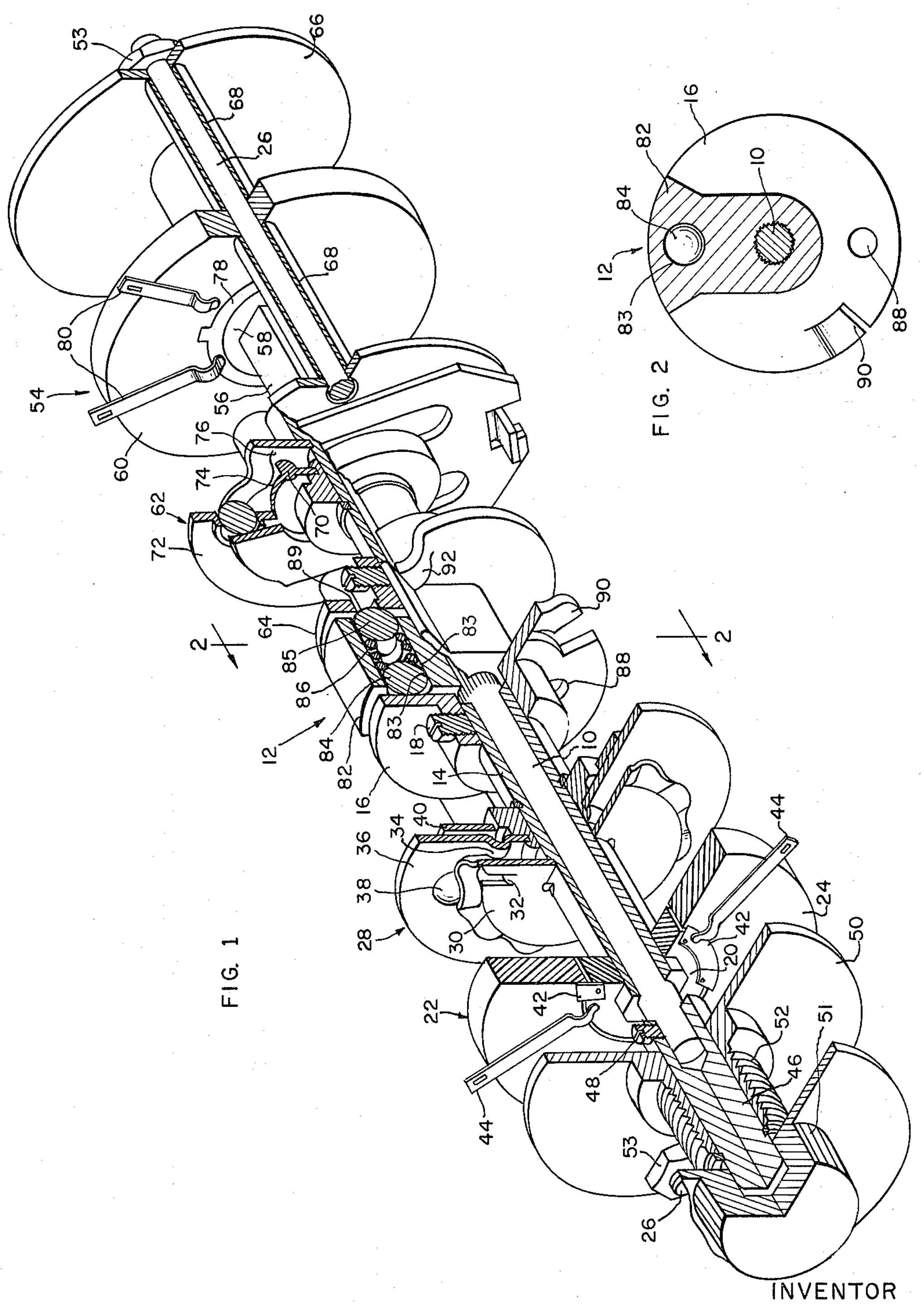
FIG. 1 is an oblique view of one embodiment of the dual switch assembly of the present invention, with parts broken away for clarity.
FIG. 2 is a vertical section view taken along the line 2—2 of FIG. 1 of one embodiment of the transfer mechanism of the present invention.

As shown in FIGS. 1 and 2, the dual switch of the present invention may include a common drive shaft 10 and a transfer mechanism 12 attached to one end of such drive shaft for rotation therewith. The drive shaft 10 extends through a hollow first switch shaft 14 having one end attached to the flange of a first annular coupling plate 16 by means of a pair of setscrews 18. The other end of the first switch shaft 14 is keyed to the rotor member 20 of a first switch section 22 of conventional construction whose stator member 24 is held in fixed position by mounting it on a pair of support rods 26 which extend parallel to the switch shaft on opposite sides thereof. A first detent and stop assembly 28 is provided for the first switch section, and includes a rotor element 30 keyed to the first switch shaft 14. Rotor element 30 is provided with a projection 32 which engages one of a pair of stops 34 provided on the stator plate 36 of the detent assembly in different rotational positions of such rotor element. The detent assembly 28 includes the usual detent ball 38 and leaf spring biasing member 40 for holding such detent ball against the detent notches in rotor plate 30. The stator plate 36 of the detent assembly is held in fixed position by the support rods 26 extending therethrough. Thus, the rotation of the drive shaft 10 is transmitted through transfer mechanism 12 and coupling plate 16 to the first switch shaft 14 causing such shaft to rotate into the nine switch positions determined by the detent assembly 28. This rotates the movable switch contacts 42 mounted on the rotor member 20 of the first switch section into engagement with different stationary switch contacts 44 mounted on the stator member 24 of the first switch section.

The drive shaft 10 may be connected to a knob shaft 46 by means of a setscrew 48 at the opposite end of the drive shaft from the transfer mechanism, or such knob shaft may be formed integrally with the drive shaft. The knob shaft 46 extends through a panel mounting sleeve 50 and is rotated by a knob 51 attached to such knob shaft. The mounting sleeve has a threaded shank 52 which extends through a hole in the control panel of the oscilloscope plug-in unit, and a mounting nut (not shown) is fastened to such threaded shank in order to clamp the switch assembly to such panel. The mounting plate 50 is attached to the support rods 26 by means of nuts 53 threaded on the front end of such rods.

A second switch section 54 is attached to a second switch shaft 56 with the rotor member 58 of such switch section keyed to such switch shaft for rotation therewith. The second switch section is provided with a stator member 60 which is held in a fixed position on support rods 26 in a similar manner to the first switch section. Likewise, a second detent and stop assembly 62 may be provided for the second switch shaft similar to the first detent and stop assembly 28. Also, a second coupling plate 64 is attached to one end of the second switch shaft 56 adjacent the opposite side of the transfer mechanism 12 from the first coupling plate 16. A support plate 56 is provided at the other end of the second switch shaft 56 by attachment to the support rods 26 to hold such switch shaft in axial alignment with the drive shaft 10 while allowing the rotation of such switch shaft within a central opening in such plate. It should be noted that all of the various switch sections, detent assemblies and coupling plates are spaced along the support rods 26 by spacer sleeves 68 surrounding such support rods and positioned between the above-mentioned switch members. The second detent assembly 62 is provided with a pair of stops 70, only one of which is shown, on the stator plate 72 of such assembly for engagement with a projection 74 on the rotor plate 76 of the detent assembly. Thus, the second switch shaft 56 is rotated through the switch positions determined by the detent assembly 62 between the two stop members 70 by means of the common drive shaft 10 whose force is transmitted through the transfer mechanism 12 and coupling plate 64 to such switch shaft. This causes the movable contacts 78 on rotor member 58 to engage different fixed contacts 80 on the stator member 60 of the second switch section.

The transfer mechanism 12 of FIGS. 1 and 2 may include a carrier member 82 which is keyed to one end of the drive shaft 10 and is provided with a cylindrical cavity 83 therethrough at a position radially spaced from the drive shaft for containing a pair of coupling balls 84 and 85 which are spring biased outwardly by a coil spring 86 between such coupling balls. The carrier member may be made in the form of a segment of a circle whose diameter is equal to the diameter of the coupling plates 16 and 64. Each of these coupling plates 16 and 64 is provided with a recess or opening 88 and 89, respectively, which is radially spaced from the drive shaft 10 the same distance as the cavity 83 so that the coupling balls can engage the openings in the coupling plates when the carrier member 82 is rotated into position over such openings. In addition, each of the coupling plates 16 and 64 may be provided with a tab 90 and 92, respectively, which projects into the path of the carrier member 82 for engagement with such carrier member. The tab 90 on coupling plate 16 engages the carrier member 82 of the transfer mechanism when such carrier member is rotated in a counterclockwise direction. This insures that the first coupling plate 16 and the first switch shaft rotate with the carrier member 82 and the drive shaft in a counterclockwise direction. However, during the rotation of the carrier member in a clockwise direction only the coupling ball 84 causes such first coupling plate and first switch shaft to rotate in such clockwise direction. In a similar manner the tab 92 on the second coupling plate 64 insures the clockwise rotation of such coupling plate by engagement with the carrier member 82 of the transfer mechanism, while counter-clockwise rotation of such coupling member is accomplished solely by means of the coupling ball 85 engaging the opening 89 in such coupling member.

The first switch section 22 may be provided with nine switch positions which are indexed by the detent and stop assembly 28. In the ninth position of the first switch section the opening 88 in the first coupling plate 16 is opposite the opening 89 in the second coupling plate 64. This allows the spring 86 to partially relax forcing the coupling ball 85 into the opening 89 in such second coupling plate. Further clockwise rotation of the drive shaft 10 causes the other coupling ball 84 to be removed from the aperture 88 in the first coupling plate because the first switch shaft is prevented from further rotation by one of the stops 34 on the detent plate 36. Thus, a transfer of the force of the drive shaft away from the first coupling member 16 to the second coupling member 64 takes place at the ninth position of the first switch section so that continued clockwise rotation of the drive shaft 10 rotates the second coupling plate and switch shaft 56 into the second switch position of the second switch section 54 as determined by the detent and stop assembly 62.

The second switch section may be provided with four switch positions by means of the second detent and stop assembly 62. The first switch position of the second switch section corresponds to the ninth switch position of the first switch section to enable the transfer of rotational force from the first coupling plate 16 to the second coupling plate 64. Therefore, when the rotor member 58 is in its first switch position, the movable contact 78 does not form a completed circuit between two fixed switch contacts 80. However, in the remaining three positions of the second switch section 54 the movable switch contact 78 does complete a circuit between the fixed switch contacts to the second vertical preamplifier having a voltage gain of one hundred through suitable attenuated networks (not shown). The second, third and fourth switch positions of the second switch section may correspond to the 20 millivolts per centimeter, 10 millivolts per centimeter, and 5 millivolts per centimeter positions of the knob 51. Thus, the dual switch assembly of the present invention shown on FIGS. 1 and 2 has twelve operative switch positions, with the first nine provided by the first switch section 22 and the last three provided by the second switch section 54 in order to cover the deflection sensitivity range of 5 millivolts per centimeter to 20 volts per centimeter. Of course additional switch positions may be added to the second switch section to carry this range down to 0.2 millivolt per centimeter.

Figure 3A:
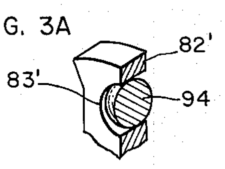
FIGS. 3A, 3B, 3C, 3D and 3E show alternative embodiments of the transfer mechanism which may be employed in the dual switch of the present invention.
Figure 3B:
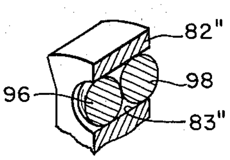
Figure 3C:
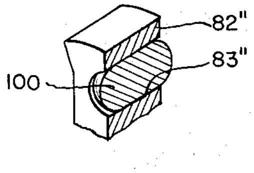
Figure 3D:
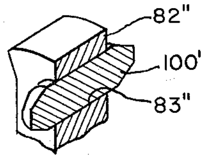
Figure 3E:
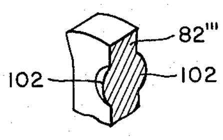

FIGS. 3A to 3E show different embodiments of the transfer mechanism 12 of the present invention. As shown in FIG. 3A the pair of coupling balls 84 and 85 and coil spring 86 may be replaced by a single coupling ball 94 which of a larger diameter than the length of the passageway 83′ of the width carrier member 82′. This means that a portion of the coupling ball 94 extends from the surface of the carrier member 82′ into engagement with one of the openings 88 or 89 in the first or second coupling plates and rolls along the surface of the other coupling plate, in order to transfer rotational movement from the drive shaft to such one coupling plate. FIG 3B shows that the single coupling ball 94 of FIG. 3A may be replaced by a pair of coupling balls 96 and 98 of equal diameter. In this embodiment the sum of the diameters of the two coupling balls 96 and 98 is greater than the length of the passageway 83″ in the carrier member 82″ so that one of such coupling balls engages one of the openings 88 and 89 in the coupling plates while the other of such balls rides on the surface of the other of such plates. FIG 3C is similar to FIG. 3B except that the two coupling balls 96 and 98 have been merged into a single coupling rod member 100 having spherical end portions whose length is longer than the length of the passageway 83″ or the width of the carrier plate 82″. FIG. 3D shows still another embodiment of the transfer mechanism 12 which is similar to the embodiment of FIG. 3C except that the coupling rod 100 is provided with frustoconical end portions for more positive contact with the openings or recesses 88 and 89 in the coupling plates. In addition, FIG. 3E shows that the carrier member 82''' may be provided with a pair of projections 102 which extend from the opposite sides of such carrier member into engagement with opening in the first and second coupling plates. In this latter embodiment of the transfer mechanism the coupling projections 102 do not move within the carrier member 82''' as do the coupling balls and rods of the previously described embodiments, but rather the carrier member itself is in the form of a leaf spring which is moved between the coupling plates 16 and 64.

Figure 5:
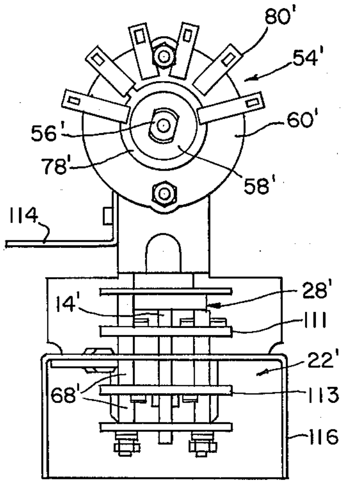
FIG. 5 is a view taken along the line 5—5 of FIG. 4.
Figure 4:
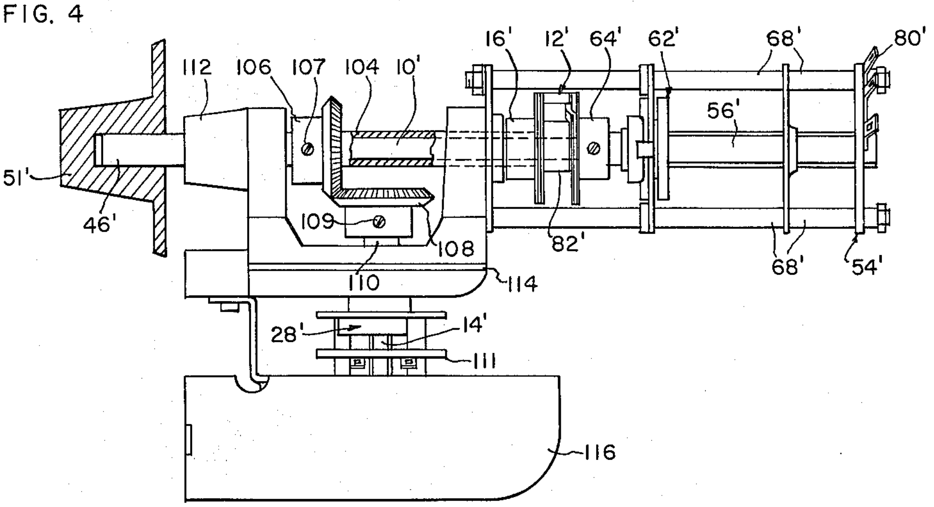
FIG. 4 is a side view of another embodiment of the dual switch assembly of the present invention.

Another embodiment of the dual switch assembly of the present invention is shown in FIGS. 4 and 5. Since this alternative embodiment is similar to that shown in FIG. 1, the same reference numerals have been used to designate like components and only the differences between these two embodiments will be described in detail. The dual switch shown in FIG. 4 includes a first switch shaft 14' which is not hollow, but which is connected to a hollow coupling shaft 104 through a first bevel gear 106 secured to the coupling shaft by a set screw 107 and a second bevel gear 108 secured by a set screw 109 to a connector shaft 110 in turn secured to the switch shaft 14'. Thus, the switch shaft 14' is mounted so that it extends substantially at right angles to a drive shaft 10' which extends through the hollow coupling shaft 104. The drive shaft 10' has one end attached to the knob shaft 46' and its other end attached to a carrier member 82' of a transfer mechanism 12'. A coupling plate 16' is secured to the end of the coupling shaft which is opposite its end secured to the gear 106. Thus, the rotational movement of the drive shaft 10' is transmitted through transfer mechanism 12' to either the coupling shaft 104 or a second switch shaft 56' by means of coupling plates 16' and 64', respectively. The rotation of the coupling shaft 104 is further transmitted through bevel gears 106 and 108 to the first switch shaft 14' in order to change the connection of the switch contacts on the first switch section 22' which may include two sets of switch plates 111 and 113. This construction allows the dual switch assembly of FIGS. 4 and 5 to be shortened in length so that it may be employed in an apparatus which cannot accomodate the longer switch assembly of FIG. 1. The entire switch assembly may be mounted on a frame 112 which may be provided with sleeve portions having internal bearings to enable the rotation of the knob shaft 46, the connector shaft 110 and the coupling shaft 104. The frame 112 may be provided with sleeve portions having internal bearings to enable the rotation of the knob shaft 46, the connector shaft 110 and the coupling shaft 104. The frame 112 may be provided with a mounting bracket 114 for attachment to the chassis oscilloscope plug-in unit. The switch plates 111 and 113 of the first switch section 22' may be separated by a grounded shield member 116 which is fastened to the frame 112. This enables the resistors and capacitors which are connected to the fixed contacts of the switch plates to form attenuator stages, to be mounted so that the input section and output section of such stages are connected to different switch plates and are separated by the shield member 116. As a result the shunt capacitance of the attenuator stages is reduced which improves the rise time capabilities and enables the range of the vertical preamplifier to be extended to 50 volts per centimeter.

It will be obvious that those having ordinary skill in the art that various changes may be made in the details of the above described preferred embodiments of the present invention without departing from the spirit of the invention. For example, all eleven positions of the first and second switch sections 22 and 54 can be used by eliminating one of the stops on each of the detent mechanisms 28 and 62. This would enable the drive shaft 10 to rotate through two complete revolutions in equal steps, with the first revolution changing the switch connections of the first switch section and the second revolution changing the switch positions of the second switch section and the transfer of rotary motion taking place at the eleventh position of the first switch section and the first position of the second switch section. Therefore, the scope of the present invention should only be determined by the following claims.

I claim:

1. An electrical switch assembly comprising:
a first switch means including a first switch member, for changing the electrical connections of a first set of switch contacts in said first switch means, said first set of contacts, including movable and fixed contacts positioned in the same plane;
a second switch means including a second switch member, for changing the electrical connections of a second set of switch contacts in said second switch means, said second set of contacts including movable and fixed contacts positioned in the same plane;
a common drive shaft; and
coupling means connecting said drive shaft to said first and second switch members and including a common transfer means operating at one rotational position of said drive shaft for transfering a force applied to said drive shaft either to said first switch member or to said second member depending upon the direction of rotation of said drive shaft in order to operate said first switch means and said second switch means independently.

2. An electrical switch assembly comprising:
a first switch means including a first switch shaft, for changing the electrical connections of a first set of fixed switch contacts and movable switch contacts mounted on separate coplanar support plates and extending perpendicular to said first shaft;
a second switch means including a second switch shaft, for changing the electrical connections of a second set of fixed switch contacts and movable switch contacts mounted on separate coplanar support plates and extending perpendicular to said second shaft;
a common drive shaft;
coupling means connecting said drive shaft to said first and second switch shafts including a common transfer device for transferring the force of said drive shaft either to said first switch shaft or to said second switch shaft by rotation into different rotational positions of said drive shaft to move said first and second switch shafts independently in order to operate said first switch means in some rotational positions of said drive shaft and to operate said second switch means in other rotational positions of said drive shaft.

3. An electrical switch assembly comprising:
a first switch means including a first switch shaft, a first rotor member connected to said first shaft and a first stator member coplanar with said first rotor member for changing the electrical connections of a first set of fixed switch contacts and movable switch contacts on said first stator and rotor members, respectively;
a second switch means including a second switch shaft, a second rotor member connected to said second shaft and a second stator member coplanar with said second rotor member for changing the electrical connections of a second set of fixed switch contacts and movable switch contacts on said second stator and rotor members, respectively;
a common drive shaft;
actuator means for rotating said drive shaft; and
coupling means connecting said drive shaft to said first and second switch shafts and including a common transfer device attached to said drive shaft to alternatively connect said drive shaft to said first switch shaft or to said second switch shaft for transfering the force of said drive shaft either to said first switch shaft or to said second switch shaft by rotation into different rotational positions of said drive shaft in order to operate said first switch means in some rotational positions of said drive shaft and to operate said second switch means in other rotational positions of said drive shaft.

4. A dual electrical switch assembly comprising:
a first switch means including a first switch shaft, for changing the electrical connections of a first set of fixed switch contacts and movable switch contacts mounted on separate support plates positioned in substantially the same plane;
a second switch means including a second switch shaft, for changing the electrical connections of a second set of fixed switch contacts and movable switch contacts mounted on separate support plates positioned in substantially the same plane;
a common drive shaft; and
coupling means connecting said drive shaft to said first and second switch shafts and including a common transfer member attached to the drive shaft for transfering the force of said drive shaft either to said first switch shaft or to said second switch shaft by rotation into different rotational positions of said drive shaft;
said transfer member being moved longitudinally with respect to said drive shaft between two coupling members connected to different ones of said first and second switch shafts to rotate said switch shafts independently in order to operate said first switch means in other positions of said drive shaft.

5. An electrical switch assembly comprising:
a first switch shaft;
a first group of movable switch contacts mounted in spaced insulated relationship on a first rotor plate attached to said first shaft to rotate with said first shaft;
a first group of fixed switch contacts mounted in spaced insulated relationship on a first stator plate coplanar with said first rotor plate about said first shaft and extending perpendicular to said first shaft and rotor plate in position to be engaged by said first movable contacts;
a first coupling member attached to said first shaft for rotation thereof and having a recess therein at a position radially spaced from said first shaft;
a second switch shaft;
a second group of movable contacts mounted in spaced insulated relationship on a second rotor plate attached to said second shaft to rotate with said second shaft;
a second group of fixed contacts mounted in spaced, insulated relationship on a second stator plate coplanar with said second rotor plate about said second shaft rotor plate and extending perpendicular to said second shaft and in position to be engaged by said second movable contacts;
a second coupling member attached to said second shaft for rotation thereof and having a recess therein at a position radially spaced from said second shaft;
a common drive shaft;
means for supporting said drive shaft and said first and second switch shafts and contact together in a composite switch assembly; and
a transfer mechanism attached to said drive shaft and positioned between said first and second coupling members,
said transfer mechanism including an element which moves into and out of said recesses in said first and second coupling members when said drive shaft is rotated to enable said first and second switch shafts to be rotated independently in accordance with the rotation of said drive shaft.

6. An electrical switch assembly comprising:
a hollow first switch shaft;
a first group of movable switch contacts mounted in spaced insulated relationship on a first rotor plate attached to said first shaft to rotate with said first shaft;
a first group of fixed switch contacts mounted in spaced insulated relationship on a first stator plate coplanar with said first rotor plate about said first rotor plate in position to be engaged by said first movable contacts;
a first stop means for controlling the rotational movement of said first shaft between predetermined limits;
a first coupling member attached to said first shaft for rotation thereof and having a recess therein at a position radially spaced from said first shaft;
a second switch shaft;
a second group of movable contacts mounted in spaced insulated relationship on a second rotor plate attached to said second shaft to rotate with said second shaft;
a second group of fixed contacts mounted in spaced, insulated relationship on a second stator plate coplanar with said second rotor plate about said second rotor plate in position to be engaged by said second movable contacts;
a second stop means for controlling the rotational movement of said second shaft between preselected limits;
a second coupling member attached to said second shaft for rotation thereof and having a recess therein at a position radially spaced from said second shaft;
a common drive shaft extending through said first switch shaft;
means for supporting said drive shaft and said first and second switch shafts, contacts and stop means together in a composite switch assembly; and
a transfer mechanism attached to said drive shaft and positioned between said first and second coupling members,
said transfer mechanism including a carrier member having an aperture therethrough fixedly attached to said drive shaft and an element slidably mounted with said aperture which projects into said recesses into engagement with said first and second coupling members and causes said first and second switch shafts to rotate independently in accordance with the rotation of said drive shaft,
said element being forced out of the recess of one of said coupling members and into the recess of the other of said coupling members during the rotation of said drive shaft when the stop means associated with said one coupling member limits further rotation of said one coupling member in order to transfer the force of said drive shaft from one switch shaft to another.

7. An electrical switch assembly, comprising:
a hollow first switch shaft;
a first group of movable switch contacts mounted in spaced insulated relationship on said first shaft to rotate with said first shaft;
a first group of fixed switch contacts mounted in spaced insulated relationship about said first shaft in position to be engaged by said first movable contacts;
a first detent means for controlling the rotational movement of said first shaft between a plurality of predetermined switch positions,
said first detent means including a first stop means for limiting the rotation of said first shaft;
a first coupling plate attached to said first shaft for rotation thereof and having a recess in the surface of one side of said first coupling plate at a position radially spaced from said first shaft;
a second switch shaft;
a second group of movable contacts mounted in spaced insulated relationship on said second shaft to rotate with said second shaft;
a second group of fixed contacts mounted in spaced, insulated relationship about said second shaft in position to be engaged by said second movable contacts;

a second detent means for controlling the rotational movement of said second shaft between a plurality of predetermined switch positions, said second detent means including a second stop means for limiting the rotation of said second shaft;

a second coupling plate attached to said second shaft for rotation thereof and having a recess in the surface of one side of said second coupling plate at a position radially spaced from said second shaft;

a common drive shaft extending through said first switch shaft in coaxial alignment with said first and second switch shafts;

means for supporting said drive shaft and said first and second switch shafts, contacts, stop means and detent means together in a composite switch assembly; and a common transfer mechanism attached to said drive shaft and positioned between said first and second coupling plates, said transfer mechanism including a carrier member having a passageway therethrough and a pair of ball members movably mounted within said passageway with a spring between said ball members to urge said ball members into said recesses into engagement with said first and second coupling plates and cause said first and second switch shafts to rotate independently in accordance with the rotation of said drive shaft, one of said ball members being forced out of the recess of one of said coupling plates while the other ball member is forced into the recess of the other of said coupling plates during the rotation of said drive shaft to transfer the forces of said shaft from one switch shaft to another.

8. An electrical switch assembly, comprising:

a first switch shaft;

a first group of movable switch contacts mounted in spaced insulated relationship on said first shaft to rotate with said first shaft;

a first group of fixed switch contacts mounted in spaced insulated relationship about said first shaft in position to be engaged by said first movable contacts;

a hollow coupling shaft mounted at an angle with respect to said first shaft;

a pair of bevel gears attached one each to said first shaft and said coupling shaft to enable the rotation of said first shaft by said coupling shaft;

a first detent means for controlling the rotational movement of said coupling shaft between a plurality of predetermined switch positions;

a first stop means for limiting the rotation of said coupling shaft;

a first coupling member attached to said coupling shaft for rotation thereof and having a recess in the surface of one side of said coupling member at a position radially spaced from said coupling shaft;

a second switch shaft;

a second group of movable contacts mounted in spaced insulated relationship on said second shaft to rotate with said second shaft;

a second group of fixed contacts mounted in spaced, insulated relationship about said second shaft in position to be engaged by said second movable contacts;

a second detent means for controlling the rotational movement of said second shaft between a plurality of predetermined switch positions;

a second stop means for limiting the rotation of said second shaft;

a second coupling member attached to said second shaft for rotation thereof and having a recess in the surface of one side of said second coupling member at a position radially spaced from said second shaft;

a common drive shaft extending through said coupling shaft;

means for supporting said drive shaft, said coupling shaft, said bevel gears and said first and second switch shafts, contacts, detent means and stop means; and a common transfer mechanism attached to said drive shaft and positioned between said first and second coupling members, said transfer mechanism including an element which moves into and out of said recesses into engagement with said first and second coupling members and rotates said coupling shaft and said second switch shaft independently in accordance with the rotation of said drive shaft, said element being forced out of the recess of one of said coupling members and into the recess of the other of said coupling members during the rotation of said drive shaft when the stop means associated with said one coupling member prevents further rotation thereof to transfer the forces of said shaft from one switch shaft to another.

References Cited by the Examiner

UNITED STATES PATENTS

| | | | |
|---|---|---|---|
| 2,281,387 | 4/42 | Sears. | |
| 2,816,183 | 12/57 | Mangel | 200—153.16 X |
| 2,927,168 | 3/60 | Brown | 200—18 |
| 3,009,993 | 11/61 | Graves et al. | 200—14 |

BERNARD A. GILHEANY, *Primary Examiner.*

UNITED STATES PATENT OFFICE

CERTIFICATE OF CORRECTION

Patent No. 3,207,861 September 21, 196

Robert G. White

It is hereby certified that error appears in the above numbered patent requiring correction and that the said Letters Patent should read as corrected below.

Column 1, line 67, for "swich" read -- switch --; column 7, line 39, for "shaft" read -- rotor plate --; line 41, strike out "rotor plate"; same column 7, line 54, strike out "shaft".

Signed and sealed this 5th day of April 1966.

(SEAL)
Attest:

ERNEST W. SWIDER
Attesting Officer

EDWARD J. BRENNER
Commissioner of Patents